INVENTORS
John K. Taylor
Stanley W. Smith
BY David Gobbins
John C. Stahl
ATTORNEYS

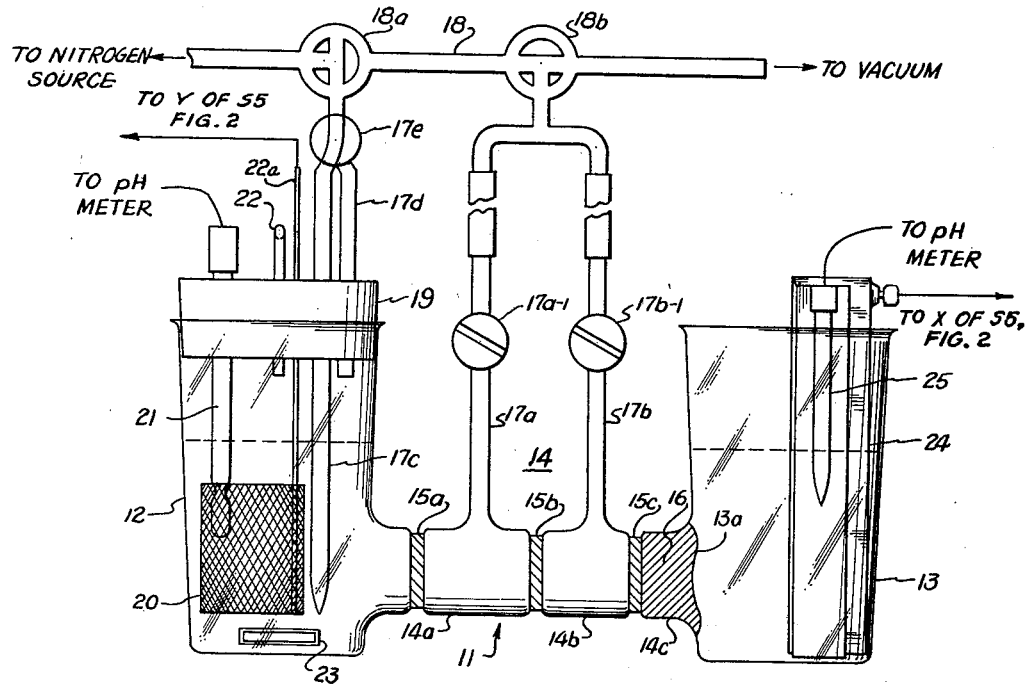

United States Patent Office 3,131,348
Patented Apr. 28, 1964

3,131,348
COULOMETRIC TITRATION COULOMETER
John K. Taylor, Hyattsville, Md., and Stanley W. Smith, Chesterfield, Ind., assignors to the United States of America as represented by the Secretary of Commerce
Filed Oct. 11, 1960, Ser. No. 62,065
9 Claims. (Cl. 324—94)

The present invention relates to an electrochemical device for the integration of electric currents and more particularly to an electrochemical device utilizing an oxidation-reduction type of reaction which permits the integration of varying currents in a highly precise manner.

A need exists for the integration of small currents in physical and chemical applications. Furthermore, increased interest in the coulometric methods of chemical analysis has created a demand for a current integrator of higher precision than the mechanical, electrical or electrochemical devices available at the present time.

One such prior art device is an acidimetric type of electrochemical cell in which the current to be integrated generates strong acid in a neutral electrolyte. The amount of acid so generated is then determined by titration with a standardized alkaline solution. Electrode reactions involved in said device, however, are not efficient to the degree required for highly precise applications. Other coulometers, based on weighing a metal deposited or dissolved by an electric current, are not sufficiently precise for small currents due to the small weight changes involved.

The present invention relates to a coulometer which permits integration of a total charge of 100 coulombs or more with a precision of approximately 1 part in 100,000 and smaller currents with almost equal precision. The current to be integrated oxidizes hydroquinone, for example, in an electrolysis cell, producing quinone and acid. The quinone is then reduced by constant-current coulometric titration, the end point being indicated by pH measurements. Said reactions may be represented as follows:

Hydroquinone+integrated current→quinone+$H^+$ (1)
$H^+$+quinone+constant current→hydroquinone (2)

While Reaction 1 is proceeding, an equivalent amount of silver chloride is reduced from the counter electrode; while Reaction 2 is proceeding, part of the silver counter electrode is oxidized to silver chloride. These reactions are not of concern in the integration process, however.

Reaction 2 is the reverse of Reaction 1, so that the quantity of current required to return the cell to the starting point, Reaction 2, is equivalent to that responsible for Reaction 1. The equivalence of this constant current, which is easy to measure, with the varying current forms the basis for the integration process. Since hydrogen ions are involved in the reactions, it is possible to use a pH measurement as the means for detection of the end point, that is, when the reverse reaction is complete.

The principal object of this invention, therefore, is to provide a method and apparatus for the precise integration of a varying current.

Another object of this invention is to provide a coulometer which is based on an oxidation-reduction type reaction.

Still another object of this invention is to provide a coulometer which may be used in conjunction with existing indicating electrode systems and related measuring equipment which are very stable and of a high degree of refinement.

A further object of this invention is to provide a coulometer which is easy to operate and does not involve any chemical operations which have to be made on a high-precision basis and which require the services of a highly skilled operator.

Other objects and features of the invention will become apparent to those skilled in the art as the disclosure is made in the following detailed description of a preferred embodiment of the invention as illustrated in the accompanying sheets of drawing in which:

FIG. 1 illustrates the coulometric cell of this invention;

FIG. 2 is a schematic diagram of the electrical circuit utilized in conjunction with the coulometric cell of FIG. 1;

Figure 3:
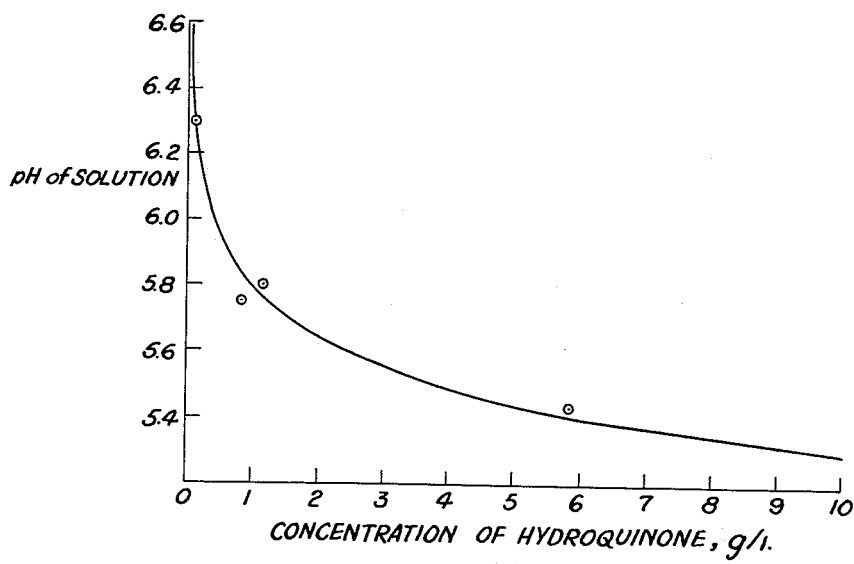
Figure 4:
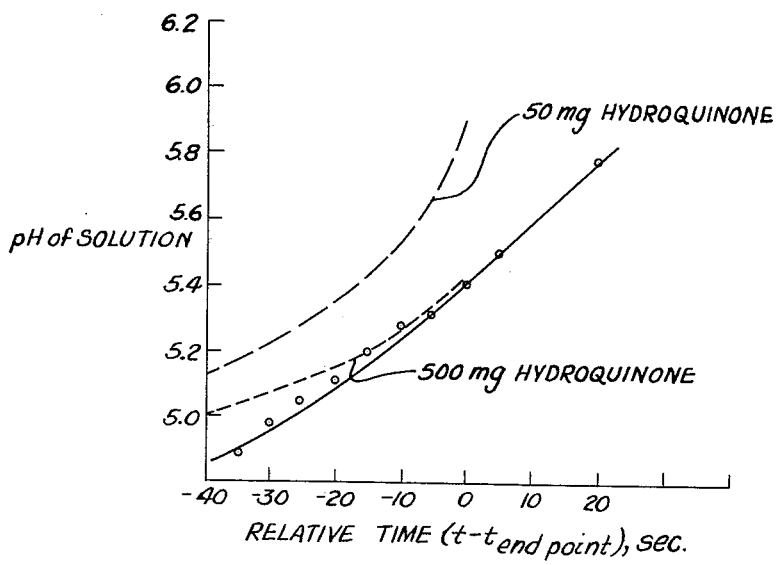

FIG. 3 consists of a series of plots showing the relation between the pH of the solution and the concentration of hydroquinone in grams/liter, as against a curve illustrating the theoretical values; and FIG. 4 shows titration curves at the end point of the reaction for calculated and experimental values, illustrated in dotted and solid line portions, respectively. The current is 10 milliamperes, corresponding to 0.05 coulomb for each 5-second titration interval.

Referring now to the drawings, wherein like reference characters designate like or corresponding parts throughout the several views, there is shown in FIG. 1, a cell 11 which consists of two electrode compartments 12 and 13, respectively, separated by a bridge 14 which is integral with said compartments and is positioned in the lower portions thereof. In a preferred form of the invention compartments 12 and 13 are constructed of Pyrex glass and are 4.5 cm. in diameter and 10 cm. in height. The bridge 14 is preferably constructed of 35 mm. tubing and is approximately 125 mm. in length. Sintered glass discs 15a—15c are sealed in said bridge in a conventional manner, the discs 15a—15b are of medium porosity whereas discs 15c is of fine porosity. An agar plug 16, hereinafter to be described in detail, is positioned in said bridge between disc 15c and entrance port 13a of compartment 13 and prevents transfer of solution to or from said compartment.

Still referring to FIG. 1 of the drawings, it is evident that discs 15a—15c further divide the bridge into compartments 14a—14c. For purposes of convenience only, henceforth throughout the body of the specification, the compartment between discs 15a-15b will be designated compartment 14a, that between discs 15b—15c, respectively, as compartment 14b, and that between disc 15c and the entrance port 13a as compartment 14c.

Tubes 17a–17b are integrally connected to bridge 14 and permit emptying and filling of compartments 14a—14b under nitrogen pressure from a manifold system 18 in a manner hereinafter to be described. Stopcocks 17a–1, 17b–1 regulate the flow of nitrogen to the tubes 17a—17b, respectively, from manifold system 18.

Referring now to compartment 12, a stopper 19, preferably constructed of rubber or the like, is sealed in the upper portion of said compartment, said stopper contains a plurality of bores through which control and measuring apparatus are inserted. Specifically, a cylindrical platinum-gauze electrode 20, 1½ cm. in diameter and 5 cm. in length, is positioned within said compartment and is connected by a lead 20a which passes through the stopper and connects via lead Y to a respective one of the center terminals of switch S5 in the electrical circuit of FIG. 2.

A glass electrode 21 of a conventional pH meter, tubes 17c and 17d which connect to the manifold system 18 through a stopcock 17e and a gas exit tube 22 pass through bores in said stopper 19. Tubes 17c and 17d admit nitrogen to the cell during a determination thereby removing carbon dioxide whereas exit tube 22, connecting with a water trap (not shown), permits the nitrogen gas to leave the cell.

An encapsulated magnetic stirring bar 23 is used to agitate the solution within compartment 12.

The compartment 13 contains a silver-silver chloride electrode 24 of large area so that the anode reaction results only in the precipitation of silver chloride on its surface without the formation of acid. The electrode 24 is connected via lead X to a respective one of the center terminals of switch S5 in FIG. 2. Preferably, the electrode 24 is fabricated from a sheet of silver 7.6 by 15 by 0.065 cm. in thickness and is corrugated. Previously, said sheet is made the anode in a separate electrolysis vessel containing hydrochloric acid as the electrolyte to partially oxidize it to silver chloride. As illustrated in FIG. 1, the electrode 24 is placed as far as possible from the entrance port 13a to assure large current capacity and good current distribution. Although a calomel reference electrode 25 of the pH meter is shown positioned in the compartment 13, it is to be understood, of course, that said electrode may alternatively be positioned in the compartment 12.

To hasten the rate of attainment of equilibrium at the end point, it is desirable to immerse the cell in a water bath maintained at approximately 45° C. A satisfactory arrangement is to place the cell 11 in an aluminum pan sitting on a combination hot plate, magnetic stirrer to provide both stirring and temperature control.

Water-pumped nitrogen is passed successively over copper at 500° C. to remove oxygen, through ascarite to remove carbon dioxide, through a 1 N $H_2O_4$ wash solution thereby entrapping any dust from the ascarite and finally through two wash solutions of distilled water to remove traces of acid and saturate the gas with water vapor. Stopcocks 18a—18b in the manifold system regulate the flow of nitrogen to tubes 17a—17d, respectively.

The electrical circuit used for the maintenance of the constant current is schematically illustrated in FIG. 2. In a preferred embodiment of the invention a lead storage battery B1 of 48 volts, which is isolated from ground, serves as the current source. It permits a high-resistance circuit so that small changes in cell resistance (voltage drop across the cell) during the course of the electrolysis will have a proportionally smaller effect on the current. A voltage dropping resistor R1, immersed in an oil bath to aid in heat dissipation and stabilization of its resistance during a measurement, permits several ranges of current. Switch S2 is a double-pole, double-throw knife switch of the Leeds and Northrup potentiometer type. When in the position illustrated in the drawings, the current is passed through a dummy resistor R2 which is adjusted to have the same resistance as the cell. Ammeter A is used to facilitate the initial adjustment of current. When switch S2 is thrown upwards, however, the current flows through the cell and simultaneously triggers the timing device. In a preferred embodiment of the invention a quartz-controlled time-interval meter, TIM, such as Berkeley Model 7250–CD, is triggered by a pulse battery B2. The meter is compared occasionally with standard time signals to check its performance. Switch S3 is a reversing switch, such as is well known to the art, allowing current to flow through the cell in either direction.

The current is measured by the voltage drop across the standard resistor RS, a 5- or a 10-ohm precision resistor, depending on the value of the current. These resistors are placed in a constant-temperature oil bath. Saturated standard cells, S.C., suitably thermostated, serve as the primary reference of voltage. The voltage drop across resistor RS may be measured directly by potentiometer P (switch S4 in "up" position) or it may be compared with that of the standard cell (switch S4 in "down" position), any difference being measured by potentiometer P.

The resistor network R4, R5 and R6 is for precise adjustment of the current. The coarse adjustment resistor, R4, consists of conventional resistance boxes. Fine regulation is achieved by means of a fixed resistor R6 and a carbon compression resistor R5. The resistance range of the network R5–R6 is approximately 18 ohms whereas the resistor R4 is 2,000 ohms in 0.1 ohm steps.

During a titration, the current is maintained constant by manual adjustment of the electrical circuit, as follows. With reference to FIGS. 1 and 2, when switch S5 is thrown to the right the current to be integrated will flow through cell 11 in a circuit that includes lead Y, electrodes 20 and 24 and lead X; and when switch S5 is thrown to the left and switch S2 is in the up position, direct current will flow through the cell. Switch S3 is positioned so that the direct current flows through cell 11 in the direction opposite to that of the current to be integrated.

The value of dummy resistor R2 may be adjusted to approximately that of cell 11. This is accomplished by throwing switch S5 to the left and throwing switch S2 up in FIG. 2, using ammeter A to measure the current through the cell, and, then throwing switch S2 down and adjusting the dummy resistor until the ammeter reads the same values of current. Resistors R4 and R5 may then be adjusted and the circuit stabilized to a desired value of current. Thereafter, when cell 11 is placed in the circuit in FIG. 2 to make the measurements described below, potentiometer P is used to measure the initial value of the direct current and monitor the same during electrolysis. Resistors 4 and 5 are adjusted, as required, to maintain the current constant.

The end point of the reaction is determined by a commercial pH meter using standard glass and reference electrodes. The precision potentiometer P may be connected across the recorder terminals of the pH meter, allowing higher precision in determining the end point of Reaction 1. Alternatively, a suitable resistance is connected in series with the meter of the instrument and the voltage drop across this is measured. This effectively expands the scale of the instrument since this voltage can be readily measured to a few hundredths of a millivolt with an ordinary potentiometer. The stability of the pH meter is of prime importance since the reproducibility of the end point is directly related thereto. A commercial meter providing automatic zero standardization has proven very satisfactory in this respect.

Before assembly, the cell 11 is cleaned in hot sulfuric-chromic acid solution and rinsed by drawing large quantities of hot distilled water through the sintered glass disc 15a—15c to insure removal of all traces of the cleaning solution.

The agar plug 16 is then formed in compartment 14c. An agar solution, made by dissolving 5 g. of agar-agar in 100 ml. of a 2 M NaCl solution and heated to near boiling is poured into the compartment. The gel sets on cooling and will not soften unless the temperature is raised above 60° C.

In the preferred embodiment of the invention the supporting electrolyte is made up from reagent grade sodium chloride which is further purified by precipitation from the saturated solution by hydrogen chloride gas, followed by recrystallization from water. Alternatively, of course, potassium chloride may be used as the supporting electrolyte.

In the preferred form of the invention the supporting electrolyte is prepared by adding 10 g. of NaCl to compartments 12 and 13, plus sufficient distilled water (approximately 85 ml.) to insure that the platinum electrode 20 is covered when the bridge is filled. After the stirring bar 23 is inserted, the stopper 19 is fitted to the cell and the cell positioned in the water bath. The nitrogen manifold 18 connections are then made as illustrated in FIG. 1.

After the pH electrodes have been standardized in a buffer solution at the temperature at which the cell is to be maintained, e.g., 45° C., the glass electrode 21 is inserted through the bore provided in stopper 19 and the calomel reference electrode 25 is placed in the isolated compartment with the silver-silver chloride electrode.

By adjusting stopcock 17e to the position illustrated in FIG. 1 of the drawings, nitrogen passes through tube 17c and is bubbled through the electrolyte in compartment 12; simultaneously the bath temperature is raised to 45° C. After bubbling for 20 to 30 minutes, the stopcock 17e is turned to allow the gas to flow through tube 17d and over the surface of the solution. The bridge is then filled by applying suction to compartments 14a—14b.

The cell electrolyte is neutralized as follows. The current is adjusted to 10 ma., as indicated on meter A in FIG. 2, and passes through the cell until the pH reaches 7. At this point, the solution in compartments 14a—14b is pushed into compartment 12 by nitrogen pressure. After mixing, it is drawn back into the bridge 14. The pH is again brought to 7 by electrolysis and the process is repeated until there is no change in pH upon blowing out compartments 14a—14b.

Hydroquinone (0.50 g.) is now added to the neutralized electrolyte compartment 12 and allowed to dissolve. The equilibrium pH (approximately 5.6) is recorded and used as the end point.

The cell is preconditioned in the following manner. With the platinum electrode 20 as anode, the current is adjusted to the 100 ma. rate and the hydroquinone is oxidized (acid is generated) for approximately 1200 seconds. The polarity is then reversed and the electrolyte reduced (base generated) for approximately 1150 seconds. The current is then changed to 10 ma. and the generation is continued to the end point. Bridge 14 is emptied, then refilled, and the solution is brought to the end point again. This procedure is continued until no change occurs on rinsing the bridge. The cell 11 is then ready to use as a coulometer.

Performance testing is carried out as follows. The current is adjusted through the dummy resistor R2 to a rate of 100 ma. With the platinum electrode 20 as anode the hydroquinone is oxidized (acid generated) for approximately 1000 seconds, while the current is continuously monitored to maintain a constant and known value.

The acid so produced is then titrated by reversing the polarity and passing a constant and accurately measured current of approximately 100 ma. until approximately 95% of the acid is neutralized. The current is then reduced to the 10 ma. rate and the end point (original equilibrium pH) is reached by the same procedure as heretofore described for conditioning the cell.

The procedure is the same for integrating an unknown current. Hydroquinone is oxidized by the current to be integrated (acid produced simultaneously) and the cell is brought back to the original condition (as evidenced by the pH meter) by means of constant-measured current. If the approximate total quantity of charge is not known, the pH must be observed occasionally to avoid generating past the end point. When the solution is back to the end point, the cell is ready to make another determination.

When following the procedure heretofore described in detail, a precision of approximately 1 part in 100,000 may be achieved. The results of a number of determinations are given below. These data were all obtained with approximately 100 coulombs input and are given as percent recovery, namely (coulombs added/coulombs recovered) ×100.

| Determination: | Percent recovery |
|---|---|
| A | 100.000 |
| B | 100.001 |
| C | 100.002 |
| D | 99.999 |
| E | 100.000 |
| F | 100.001 |
| G | 99.999 |
| H | 99.999 |
| I | 100.002 |
| J | 100.001 |

The use of a rather concentrated salt solution to carry the current effectively minimizes electromigration of hydrogen ions across the bridge during Reaction 1. The reactions at the platinum electrode 20 are 100% efficient as long as the silver-silver chloride electrode 24 is maintained in a separate compartment. In a modification of the apparatus heretofore described, electrode 24 may be installed in the same compartment with the generating electrode, the efficiency of the reduction reaction, however, will be less than 100% due to the finite solubility of silver chloride in the electrolyte and its subsequent reduction (plating out) on the cathode.

It is necessary to exclude all traces of foreign acid or alkali from the cell. For example, the leaching of $10^{-4}$ ml. of cleaning solution from the walls of the cell would result in an error of approximately 3 parts per 1,000.

The precision of the detection of the end point depends on the reproducibility of the pH meter readings and on the slope of the pH-time curve (FIG. 3). The arrangement is of sufficient stability and sensitivity to make the pH measurements reliable to about ±0.002 unit.

The slope of the pH-time curve (see FIG. 3) is dependent upon the concentration and volume of the electrolyte in the cell. Hydroquinone is a very weak acid, $K_i = 1.1 \times 10^{-10}$, and exhibits slight buffering action at the end point. Since the value for the slope increases as the solution is diluted, it is desirable to use the most dilute solution practicable. At the same time, the volume of the working compartment of the cell must be kept small to insure significant changes in the pH for small changes of reduction at the end point.

Theoretically, 55 mg. of hydroquinone is oxidized by 100 coulombs of electricity. To prevent concentration polarization effects, a larger amount must be used. For example, poor results were obtained with a two-fold excess of hydroquinone present but a six-fold excess was found to be adequate for efficient operation of the cell. As a conservative measure, a nine-fold excess of hydroquinone, corresponding to 500 mg. or to a concentration of 6 g./l. in the 85-ml. cell is used.

A plot showing the variation of the pH of the electrolyte with concentration of hydroquinone is illustrated in FIG. 3. The theoretical curve is shown for purposes of comparison. The pH value indicated at the operating concentration of 6 g./l. is 5.63(±0.10 a.d.) and is the average of the end point values for 20 integrations.

FIG. 4 shows the variation of the pH of the cell as the end point of Reaction 2 is reached, for two different amounts (50 mg. and 500 mg.) of hydroquinone. In said figure the calculated results are shown in dotted line portions as against the experimental results represented by a solid line. For the cell containing 50 mg. of hydroquinone, approximately the theoretical amount for 100 coulombs, 0.0004 coulomb produces a change in pH of 0.002 unit. For the cell containing 500 mg. of hydroquinone, the same change in pH requires 0.001 coulomb.

It is to be understood, of course, that the disclosure is not limited to the use of hydroquinone. Any reversible oxidation-reduction system is the sole requirement. For example, ferrous iron may be oxidized to ferric iron and reduced back to the ferrous state. A suitable detector for the end point, such as a platinum electrode, would be required, of course. Alternatively, ferrocyanide ion, silver ion and a mixture of uranyl and titanyl ions may also be utilized.

The performance of the coulometer was studied extensively at the 100-coulomb level because this amount of charge corresponds to one milliquivalent, a convenient amount of chemical reaction. For small amounts of electricity, a somewhat lower precision of integration is to be expected. Larger amounts of current should be integratable with precision comparable to that heretofore mentioned, provided appropriate modification of the technique, including concentration of electrolyte and electrode dimensions, are made.

It should be understood, of course, that the foregoing disclosure relates to only preferred embodiments of the invention and that it is intended to cover all changes and modifications of the invention herein chosen for the purposes of the disclosure, which do not constitute departures from the spirit and scope of the invention.

What is claimed is:

1. A system for integrating an electrical current comprising: an electrolysis cell containing in solution an electrolyte and a substance capable of being reversibly oxidized and reduced by an electrolytic process, said cell including means for measuring the ionic composition of said substance, means for adjusting said substance to a state of equilibrium wherein the substance has a preferred ionic composition, means for passing the current to be integrated through said cell in a first direction, a source of substantially constant current, means for passing said constant current through said cell in a direction opposite to said first direction until said substance is returned to said state of equilibrium so that the integrated current is substantially equal to the product of the constant current and the time during which the constant current passes through said cell, means for measuring the magnitude of said constant current, and means for measuring the time during which said constant current passes through said cell.

2. The system set forth in claim 1 wherein said electrolyte is an alkali chloride electrolyte and said substance is hydroquinone.

3. The system set forth in claim 1 wherein the means for adjusting said electrolyte includes means for making a pH measurement.

4. The system set forth in claim 1 wherein said electrolyte is an alkali chloride electrolyte and said substance is selected from the group consisting of hydroquinone, ferrous iron, ferro-cyanide ion, silver ion, and a mixture of uranyl and titanyl ions.

5. A system for integrating an electrical current comprising: an electrolysis cell including a first and second chamber, said first chamber holding a solution containing an electrolyte and a substance capable of being reversibly oxidized and reduced by an electrolytic process, said second chamber holding an electrolyte in solution, a first and second electrode positioned in said first and second chamber, respectively, said cell including means for measuring the ionic composition of said substance, means for adjusting said substance to a state of equilibrium wherein the substance has a preferred ionic composition, an enclosed bridge positioned between said first and second chamber, a porous septa positioned in said bridge and adjacent to said first chamber, so that the solution in said first chamber may transfer into said bridge, means for substantially preventing transfer of solution from said bridge to the second chamber while permitting electrolytic conduction between the bridge and second chamber, means for applying pressure to the solution in said bridge in such a manner that it will pass into said first chamber, means for applying pressure to the solution in said first chamber in such a manner that it will pass into said bridge, means connected to said first and second electrode for passing the current to be integrated through said cell in a first direction, a source of substantially constant current, means connected to said first and second electrode for passing said constant current through said cell in a direction opposite to said first direction until said substance is returned to said state of equilibrium so that the integrated current is substantially equal to the product of the constant current and the time during which the constant current passes through said cell, means for measuring the magnitude of said constant current, and means for measuring the time during which said constant current passes through said cell.

6. An electrolysis cell comprising: a first and second chamber, said first chamber holding a solution containing an electrolyte and a substance capable of being reversibly oxidized and reduced by an electrolytic process, said second chamber holding an electrolyte in solution, a first and second electrode positioned in said first and second chamber, respectively, said cell including means for measuring the ionic composition of said substance, an enclosed bridge positioned between said first and second chamber, a porous septa positioned in said bridge and adjacent to said first chamber so that the solution in said first chamber may transfer into said bridge, means for substantially preventing transfer of solution from said bridge to the second chamber while permitting electrolytic conduction between the bridge and second chamber, means for applying pressure to the solution in said bridge in such a manner that it will pass into said first chamber, and means for applying pressure to the solution in said first chamber in such a manner that it will pass into said bridge.

7. The electrolysis cell in claim 6 wherein the pressure applying means comprises: means for selectively applying an inert gas under pressure to said bridge or to the surface of the solution in said first chamber, gas exit means connected to said first chamber, and means for selectively establishing a vacuum in said bridge.

8. The electrolysis cell in claim 7 including means for bubbling said inert gas through the solution in said first chamber.

9. The electrolysis cell in claim 6 including at least a second porous septa positioned in said bridge to form at least two compartments therein.

References Cited in the file of this patent

UNITED STATES PATENTS

| | | |
|---|---|---|
| 2,621,671 | Eckfeldt | Dec. 16, 1952 |
| 2,685,025 | Root | July 27, 1954 |
| 2,752,306 | Juda | June 26, 1956 |
| 2,832,734 | Eckfeldt | Apr. 29, 1958 |
| 3,025,227 | Kollsman | Mar. 13, 1962 |

OTHER REFERENCES

Publication—Analytical Chemistry, vol. 57, 1955, pp. 1197 through 1199.

Electronics Publication—Current Integration with Solion Liquid Diodes, by Lane and Cameron, pp. 53–55 of Electronics Magazine, February 27, 1959.